(12) United States Patent
Li

(10) Patent No.: US 9,558,757 B1
(45) Date of Patent: Jan. 31, 2017

(54) SELECTIVE DE-REVERBERATION USING BLIND ESTIMATION OF REVERBERATION LEVEL

(71) Applicant: Amazon Technologies, Inc., Seattle, WA (US)

(72) Inventor: Xiaoxue Li, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/627,956

(22) Filed: Feb. 20, 2015

(51) Int. Cl.
*G10L 21/00* (2013.01)
*G10L 21/0208* (2013.01)

(52) U.S. Cl.
CPC .................................. *G10L 21/0208* (2013.01)

(58) Field of Classification Search
USPC .......................... 704/226, 246, 247, 251, 252
See application file for complete search history.

(56) References Cited

U.S. PATENT DOCUMENTS

| 5,040,219 A * | 8/1991 | Ando ..................... G10K 15/12 381/61 |
| 8,271,277 B2 * | 9/2012 | Kinoshita ................ H04R 3/04 381/66 |
| 2005/0004792 A1 * | 1/2005 | Ando ....................... G10L 15/02 704/217 |
| 2009/0248403 A1 * | 10/2009 | Kinoshita ................ H04R 3/04 704/219 |

* cited by examiner

*Primary Examiner* — Leonard Saint Cyr
(74) *Attorney, Agent, or Firm* — Knobbe, Martens, Olson & Bear, LLP

(57) ABSTRACT

Features are disclosed for estimating reverberation an audio signal without prior knowledge of the sound captured in the audio signal and without prior knowledge of the environment in which the sound was captured. This reverberation estimation may be referred to as "blind estimation." The reverberation may be blindly estimated using autocorrelation of the sound intensity of the signal with respect to time. The blind estimation can be used to decide whether or not to mitigate the effects of reverberation in the signal prior to performing subsequent processes, such as automatic speech recognition.

20 Claims, 6 Drawing Sheets

SELECTIVE DE-REVERBERATION USING BLIND ESTIMATION OF REVERBERATION LEVEL

BACKGROUND

Computing devices can be used to process a user's spoken commands, requests, and other utterances into written transcriptions. In a typical implementation, an automatic speech recognition system may take an audio signal (or data derived therefrom) as input and, using various models, determine the most likely sequence of words spoken by the user. The results can then be used by various applications to initiate a computing task, store a record of the transcription, or the like.

Many automatic speech recognition systems suffer from a lack of robustness when processing utterances in the presence of additional sounds, such as reverberation, acoustic echo, interfering speech, and environmental noise. Reverberation occurs when sound propagates in an environment (e.g., room or other enclosed space), causing a build-up of reflections of the sound. The sound reflections are typically detected within about 30 milliseconds of the original sound (in contrast with acoustic echoes, which are usually detected >30 milliseconds after the original sound). When the sound source is removed, the reflecting sound is absorbed by the environment and the sound level decays. A common measurement of reverberation, known as "RT60," is the amount time it takes for the intensity of a sound to decay by 60 decibels.

Automatic speech recognition systems configured to process audio signals captured in the presence of a particular level of reverberation may not produce satisfactory results when processing audio signals captured in the presence of a different level of reverberation. To compensate for this limitation, some systems determine the level of reverberation (e.g., the RT60 value) and adjust processing accordingly. For example, a system may play a recording with known acoustic characteristics, and then compute the level of reverberation based on an input signal captured by a microphone during and after playback of the recording. The detected reverberation level can then be used to adjust processing of one or more system components to improve speech recognition performance.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

FIG. 4 is a flow diagram of an illustrative process for blind estimation of reverberation according to some embodiments.

DETAILED DESCRIPTION

Figure 1:
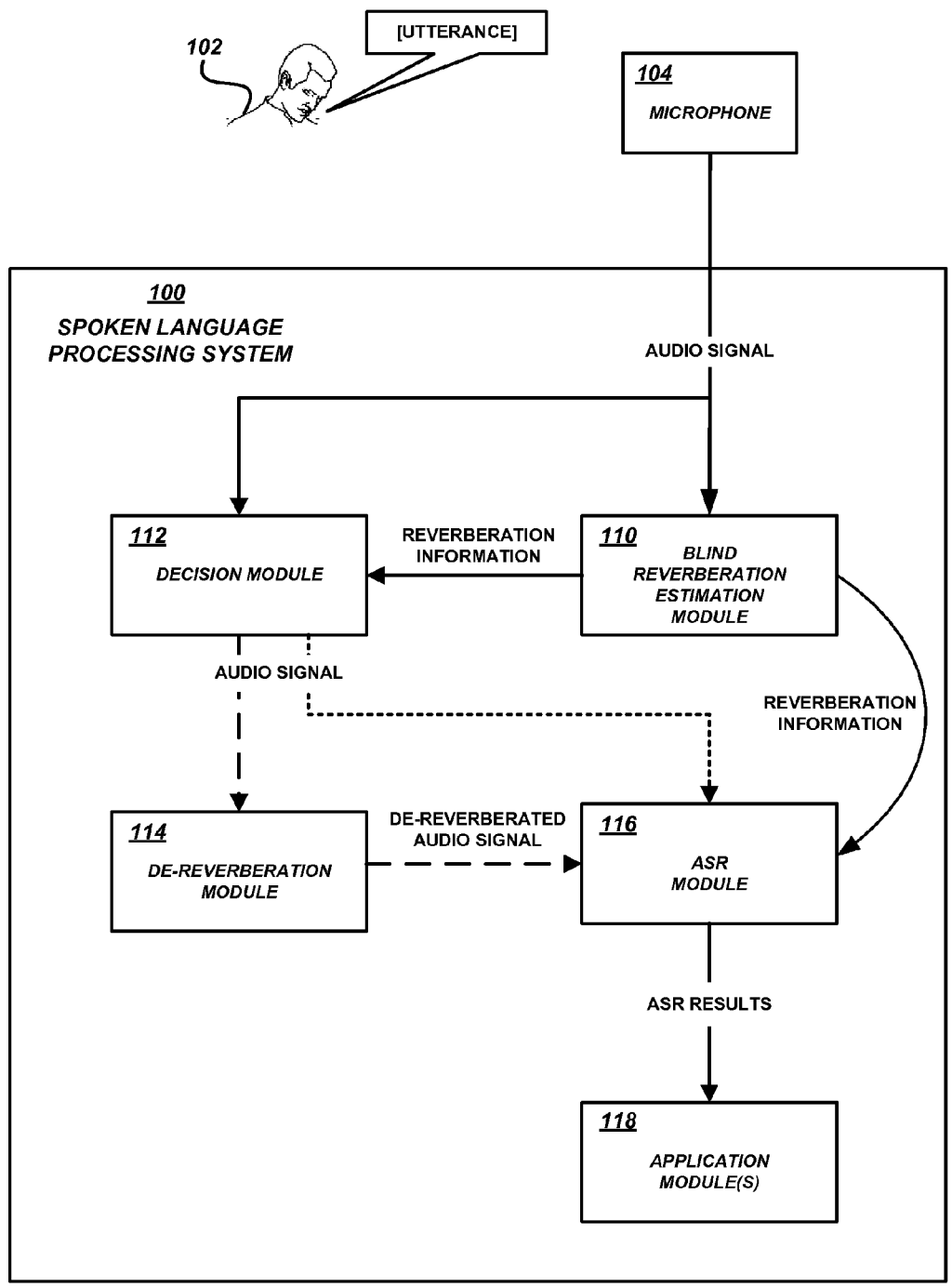
FIG. 1 is a block diagram of an illustrative spoken language processing system that implements blind estimation of reverberation according to some embodiments.

The present disclosure is directed to blind estimation of reverberation level in an audio signal, and use of the blind estimation to selectively apply de-reverberation to the audio signal. Reverberation refers to the reflection of sound within an environment (e.g., an enclosed space) such that the sound can be detected after the source of the sound is removed or the sound otherwise ceases to be generated. Excess reverberation can degrade the accuracy of automatic speech recognition ("ASR") by interfering with recognition of subsequent words or subword units (e.g. phonemes), by causing words or subword units to sound differently than they are modeled by the ASR system, etc. In some embodiments, reverberation can be mitigated or eliminated through selective application of de-reverberation. De-reverberation is a process by which the effects of reverberation in an audio signal or other data are reduced or eliminated (e.g., an audio signal is processed to reduce or remove echoes, noise, and reverberation effects from the audio signal to improve speech intelligibility). The selective application of de-reverberation may be based on a "blind" estimation of the reverberation in an environment as detected in audio recorded in the environment, such as audio of an utterance or set of utterances to be recognized by the ASR system. Blind estimation can include estimating reverberation without requiring prior knowledge of environmental parameters (e.g., room volume) and without requiring prior knowledge of the sound being analyzed (e.g., without using a pre-recorded sound). Advantageously, blind estimation can allow a system to selectively and automatically apply de-reverberation after the environment has changed, such as after the addition or removal of people and/or objects, after a device has been moved to a different environment, etc. In some embodiments, blind estimation can allow de-reverberation to be automatically and selectively applied on an utterance-by-utterance basis.

Some conventional systems determine reverberation level using a test sound, such as a pre-recorded sound or a sound with pre-determined characteristics (e.g., pink noise). The test sound can be played and stopped, and reverberation can be determined based on detection and analysis of sound after playback of the test sound has been stopped. Because the system knows when the test sound has been played and stopped, the reverberation analysis can focus on the specific portion of the signal that corresponds to the time after the test sound has been stopped. However, determining reverberation using this method requires the playback or generation of a test sound that is clearly audible over any background noise, which may not be desirable to users of the system. In addition, the reverberation level cannot be automatically updated to reflect changes in the environment (e.g., additional or removal of objects/people, moving the system to a different environment altogether) because the test sound playback and analysis need to be repeated to update the reverberation determination.

Some aspects of the present disclosure relate to a system that implements blind estimation of reverberation without prior knowledge of the environment, and without the use of pre-recorded or pre-determined test sounds. Instead, an audio signal that includes a user utterance to be recognized can be analyzed to determine the reverberation level of the environment at the time the utterance was made. Because the sound captured in the signal was not generated by the system as part of a reverberation test, the system does not have knowledge of the specific point in time at which the source of the sound was removed (e.g., the point at which a user stopped speaking), and cannot measure the natural decay of sound from this point. Instead, the system can approximate the rate at which sound will decay. The decay rate estimation can be used to compute the time it takes for the signal to decay by a particular amount (e.g., 20, 30, or 60 decibels). This time may be referred to as the reverberation time ("RT"), and different versions may be indicated by the corresponding magnitude of decay (e.g., "RT60" is the time that corresponds to a decay of 60 dB). The RT60 value is a commonly-used acoustic parameter to measure the reverberation level. The RT60 value can be estimated because direct observation of a sound decay of at least 60 decibels can be rare in normal situations (e.g., automatic speech recognition of human utterances).

Additional aspects of the present disclosure relate to methods of analyzing audio signals to estimate the rate at which sound is decaying. In some embodiments, autocorrelation can be used to determine the correlations in a signal over time. A graph of the autocorrelation calculations, referred to as an "auto-correlogram," can be analyzed to detect the peak correlation of an audio signal at a particular time index (corresponding to a particular autocorrelation delay). The "tail" or portion of the auto-correlogram following the peak can be identified, and its downward slope can be used to estimate the reverberation decay. For example, a sliding window can be used to determine the maximum values or envelope of the auto-correlogram from the peak. Line fitting can be performed using the envelope to approximate the decay rate of sound intensity. The approximated decay rate can be used to determine the RT60 value, even when the signal intensity does not actually decay by 60 decibels (e.g., the maximum in the signal was less than 60 dB above the background noise).

Further aspects of the present disclosure relate to the selective use of de-reverberation. In some embodiments, the blindly-estimated reverberation level (e.g., RT60 value) can be used to determine whether or not to implement de-reverberation. Illustratively, if the RT60 value is above a threshold value, indicating a longer time for sound intensity to decay after the source of the sound is removed, de-reverberation of the audio signal can improve speech recognition results generated using the audio signal. If the RT60 value is below a threshold value, de-reverberation can be de-activated, suppressed, or otherwise not used. In such cases, speech recognition performance may be satisfactory without de-reverberation due to the short period of time for a sound to decay, and/or de-reverberation may actually degrade the audio signal and reduce speech recognition performance.

Various aspects of the disclosure will now be described with regard to certain examples and embodiments, which are intended to illustrate but not limit the disclosure. Although the examples and embodiments described herein will focus, for the purpose of illustration, on specific devices and methods of signal analysis and processing in the context of automatic speech recognition, one skilled in the art will appreciate that the example devices and methods described herein are illustrative only, and are not intended to be exhaustive or limiting.

Example Spoken Language Processing System

FIG. 1 depicts an illustrative spoken language processing system 100 that implements blind estimation of reverberation. In some embodiments, as shown, the spoken language processing system 100 includes a blind reverberation estimation module 110 that estimates reverberation levels from audio signals generated by a microphone 104, a decision module 112 that determines whether to activate or suppress de-reverberation based on the blindly estimated reverberation levels, a de-reverberation module 114 to implement de-reverberation, an ASR module 116 to perform speech recognition, and one or more application modules 118 that perform various operations using ASR results. In some embodiments, a spoken language processing system 100 may include additional, fewer, and/or alternative module or components.

The spoken language processing system 100 can be any computing system operable to receive and process audio signals or data derived therefrom. For example, the spoken language processing system 100 may include desktop computing devices, handheld computing devices, server computing devices, mainframe computers, other computing devices, some combination thereof, etc. In some embodiments, the spoken language processing system 100 can include several devices physically or logically grouped together, such as an application server and a client device.

In some embodiments, the features and services provided by the spoken language processing system 100 may be implemented as web services consumable via a communication network, such a local area network ("LAN"), wide area network ("WAN"), cable network, satellite network, etc. or some combination thereof, each network potentially having access to and/or from the Internet. In further embodiments, the spoken language processing system 100 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

In some embodiments, the spoken language processing system 100 (or certain modules or components thereof) may be physically located on a user-operated device, such as a tablet computer, desktop computer, laptop computer, mobile phone, set-top box, gaming console, etc. For example, a user-operated device may include an integrated ASR module or system such that no network access is required in order to use some or all of its features. As another example, a portion of blind reverberation estimation, ASR processing, and/or other system functionality may implemented on a user-operated device, and a portion of the spoken language processing system 100 components and features may be accessible via a communication network.

In an illustrative embodiment, a user 102 may make an utterance in a particular environment, such as room or other enclosed space. A microphone 104 may capture the utterance, reverberation, background noise, and other sounds, and generate a signal or other audio data that can be processed by a spoken language processing system 100. The microphone 104 may be integrated with the spoken language processing system 100, or it may be a separate device in communication with the spoken language processing system 100. In some embodiments, multiple microphones may capture audio and provide signals and/or other data to the spoken language processing system 100.

Figure 2:
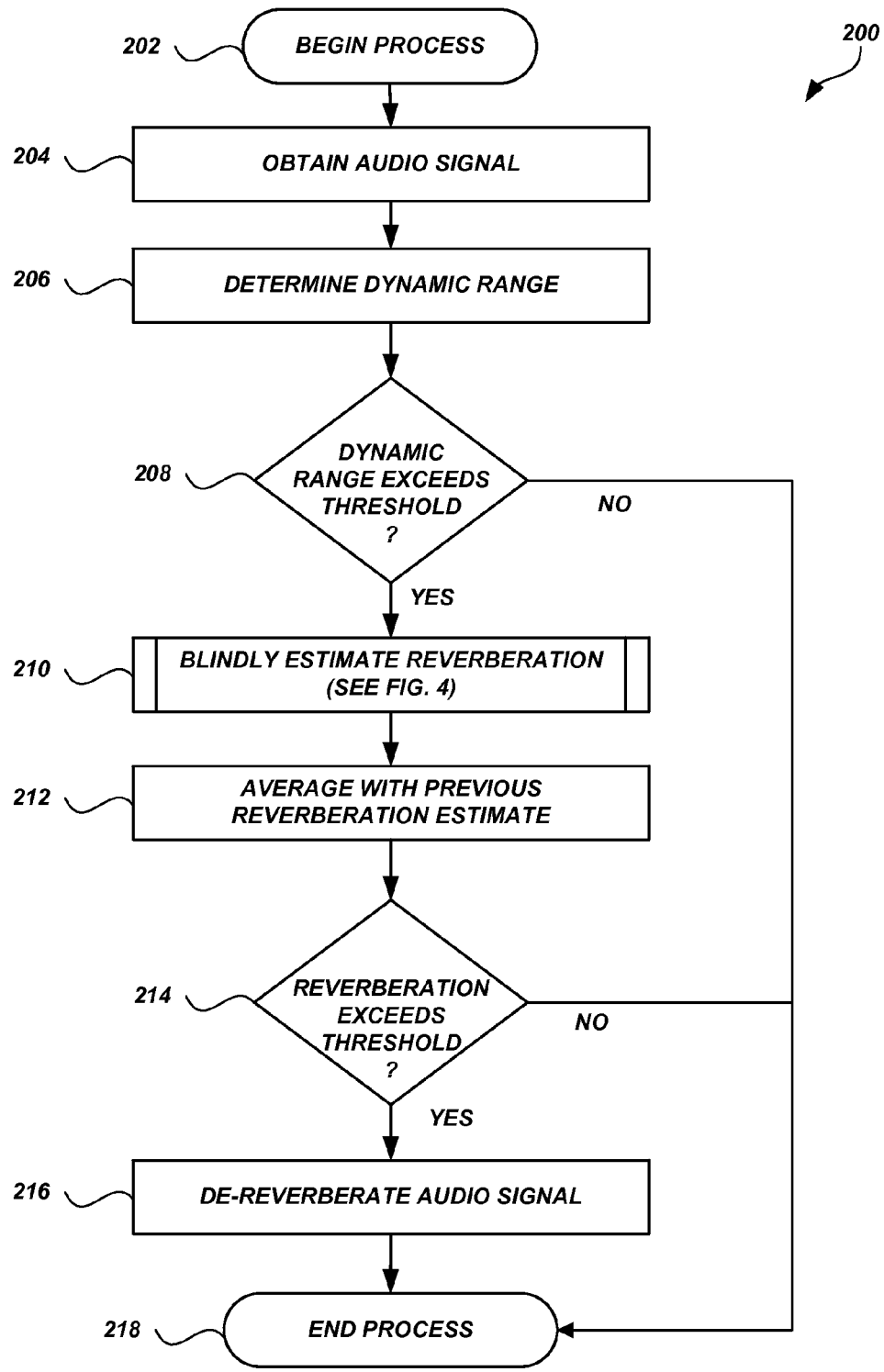
FIG. 2 is a flow diagram of an illustrative process for selectively implementing de-reverberation based on blind estimation of reverberation according to some embodiments.

The blind reverberation estimation module 110 can receive the audio signal and/or other data, and blindly estimate the reverberation level for the current environment at the current time (or, if previously-recorded audio is being analyzed, the reverberation level of the environment can be blindly estimated for the time the audio was captured). The blind reverberation estimation module 110 can provide information regarding the reverberation level to the decision module 112, which can use the information to determine whether to use the de-reverberation module 114 to generate a de-reverberated audio signal by applying de-reverberation to the audio signal. Illustratively, decision module 112 may determine whether to apply de-reverberation to the audio signal based on an RT60 value (or some proxy, such as an RT20 or RT30 value) determined by the blind reverberation estimation module 110. If the value exceeds some threshold (e.g., there is "excess" reverberation), then de-reverberation can be applied; otherwise, if the value falls below the threshold (e.g., there is little reverberation), the decision module 112 may determine not to apply de-reverberation. In some embodiments, the decision module 112 may activate or deactivate the de-reverberation module 114, bypass or provide the audio signal to the de-reverberation module 114, etc. An illustrative process for blindly estimating reverberation and selectively de-reverberating an audio signal is shown in FIG. 2 and described in greater detail below.

The ASR module 116 can receive a signal with or without de-reverberation, depending upon the decision of the decision module 112. The ASR module 116 can generate ASR results, such as a transcript or n-best list of transcripts of the utterance, and provide the results to some other module, component, or system. In some embodiments, the ASR module 116 may provide the ASR results to an application module 118, such as a module configured to interpret and act upon spoken commands.

The ASR module 116 may include an acoustic model and a language model. The acoustic model can be used to generate hypotheses regarding which subword units (e.g., phonemes) correspond to an utterance based on the acoustic features of the utterance. The language model can be used to determine which of the hypotheses generated using the acoustic model is the most likely transcription of the utterance based on lexical features of the language in which the utterance is spoken. In some embodiments, one or more of the models (e.g., an acoustic model) may be trained using data with a particular level of reverberation, and may therefore be most accurate or otherwise configured for use on audio signals with that particular level of reverberation. When used to process signals with other levels of reverberation, the acoustic model may produce less accurate or otherwise less desirable results, particularly in comparison with other acoustic models configured for use with the other levels of reverberation. In such embodiments, the blind reverberation estimation module 110 can provide the blind reverberation estimate to the ASR module 116, to an application module 118, or to some other module or component. The ASR module 116 may receive the blind reverberation estimate and base ASR processing on the estimate in some way, such as by selecting or adapting models (e.g., acoustic models) for the estimated reverberation of the current environment. In some embodiments, a spoken language processing system 100 may implement such reverberation-specific ASR processing instead of, or in addition to, using selective de-reverberation based on blindly estimated reverberation.

Example Process for Selective De-Reverberation

FIG. 2 shows an illustrative process 200 for blindly estimating reverberation in an environment, and determining whether or not to de-reverberate an audio signal captured in the environment prior to performing additional processing. Advantageously, a spoken language processing system 100 implementing the process 200 can blindly estimate reverberation without prior knowledge of the specific times that the source of detected sound was active and without prior knowledge of the specific sound that is detected (e.g., without using a test recording). In this way, the system 100 can automatically (e.g., without user intervention) determine and adjust to changes in reverberation without requiring the playback, detection, and processing of predetermined test sounds.

The process 200 begins at block 202. The process 200 may be embodied in a set of executable program instructions stored on a computer-readable medium, such as one or more disk drives, of a computing system associated with the spoken language processing system 100, such as the computing system 600 shown in FIG. 6 and described in greater detail below. When the process 200 is initiated, the executable program instructions can be loaded into memory, such as RAM, and executed by one or more processors of the computing system.

At block 204, the spoken language processing system 100 can obtain an audio signal. The audio signal may be provided by a microphone 104, as shown in FIG. 1, or by some other acoustic sensor. Illustratively, the audio signal may include audio of an utterance made by a user 102 and captured by the microphone 104 in a particular environment, such as a room.

Some audio signals may not be satisfactory candidates for blind estimation of reverberation. For example, a signal that has a small dynamic range (e.g., a peak intensity of only 10-20 dB above background noise level) may not provide enough information from which to estimate the RT60 value with a satisfactory degree of accuracy. As another example, some implementations estimate the RT60 value from a reduced range of input values (e.g., those that ignore the first 5 dB of decay and use a range of 5 dB less than the peak to 10 dB greater than the background noise), and therefore a minimum dynamic range may be desirable or required.

Figure 3:
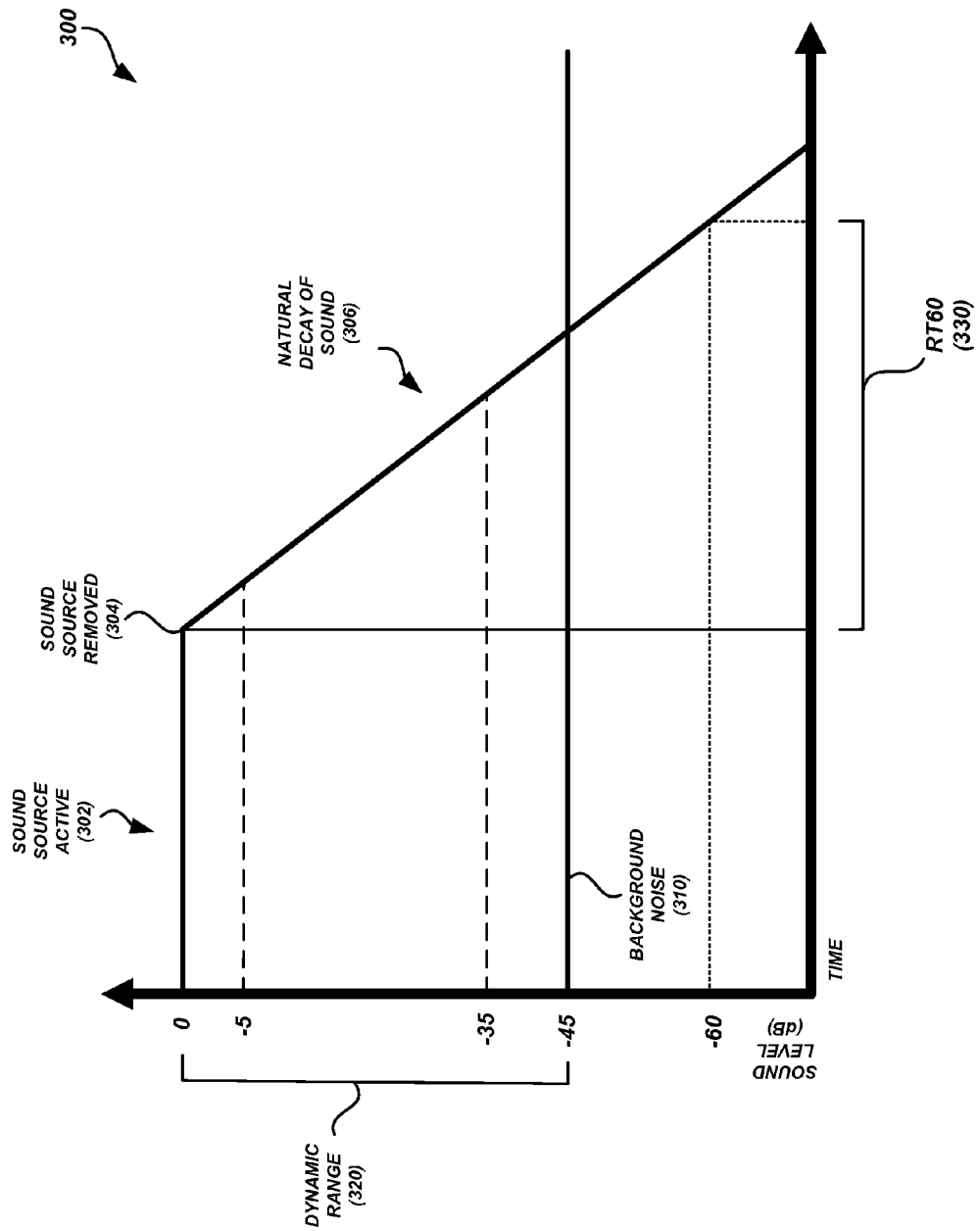

FIG. 3 is a diagram 300 of the intensity of an illustrative sound over time. As shown, a sound source may be active at 302, and may be stopped at 304. The point at which the sound source is removed may be considered the "0 dB" point because it is the starting point for the dynamic range determination. The total dynamic range may then correspond to the range between the 0 dB point and the level of background noise 310. In the illustrated example, the dynamic range 320 is 45 dB, because the level of background noise is at the −45 dB level with respect to the point at which the sound source was removed 304. A dynamic range of 45 dB can be a large enough dynamic range to determine an RT30 value even when the first 5 dB are ignored because a decay of 30 dB may be observed before a point that is 10 dB greater than the background noise is reached. In contrast, a dynamic range of only 35 dB may not be large enough because a decay of 30 dB from the −5 dB level cannot be observed without coming within 10 dB of the background noise. In such cases, the reverberation may not be estimated using the current audio signal, as described in greater detail below. In some embodiments, a different decay may be observed in such cases, such as a 20 dB decay that can be used to determine the RT20 value.

Returning to FIG. 2, at block 206 the blind reverberation estimation module 110 or some other module or component of the spoken language processing system 100 can determine the dynamic range of the audio signal. The blind reverberation estimation module 110 may use the determined dynamic range in order to determine whether to proceed with the blind reverberation estimation process, as described above and in greater detail below with respect to decision block 208.

At decision block 208, the blind reverberation estimation module 110 or some other module or component of the spoken language processing system 100 can determine whether the dynamic range is satisfactory to continue with blind estimation of the reverberation. In some embodiments, a predetermined or dynamically determined threshold may be used. For example, if the blind reverberation estimation module 110 is configured to extrapolate the RT60 value from data corresponding to an observed RT30 value, then the threshold dynamic range may be 45 dB (30 dB for the observed RT30, plus the initial 5 dB decay that is ignored while still being at least a 10 dB greater than the background noise level). If the dynamic range meets or exceeds the threshold, the process 200 may continue to block 210. Otherwise, if the dynamic range fails to meet the threshold, then no blind estimate of reverberation generated, and the process terminates at block 218. In some embodiments, de-reverberation may still be applied even though the dynamic range fails to meet the threshold. For example, prior blind estimates of reverberation may be used to determine that de-reverberation should be used, as described in greater detail below.

Figure 4:
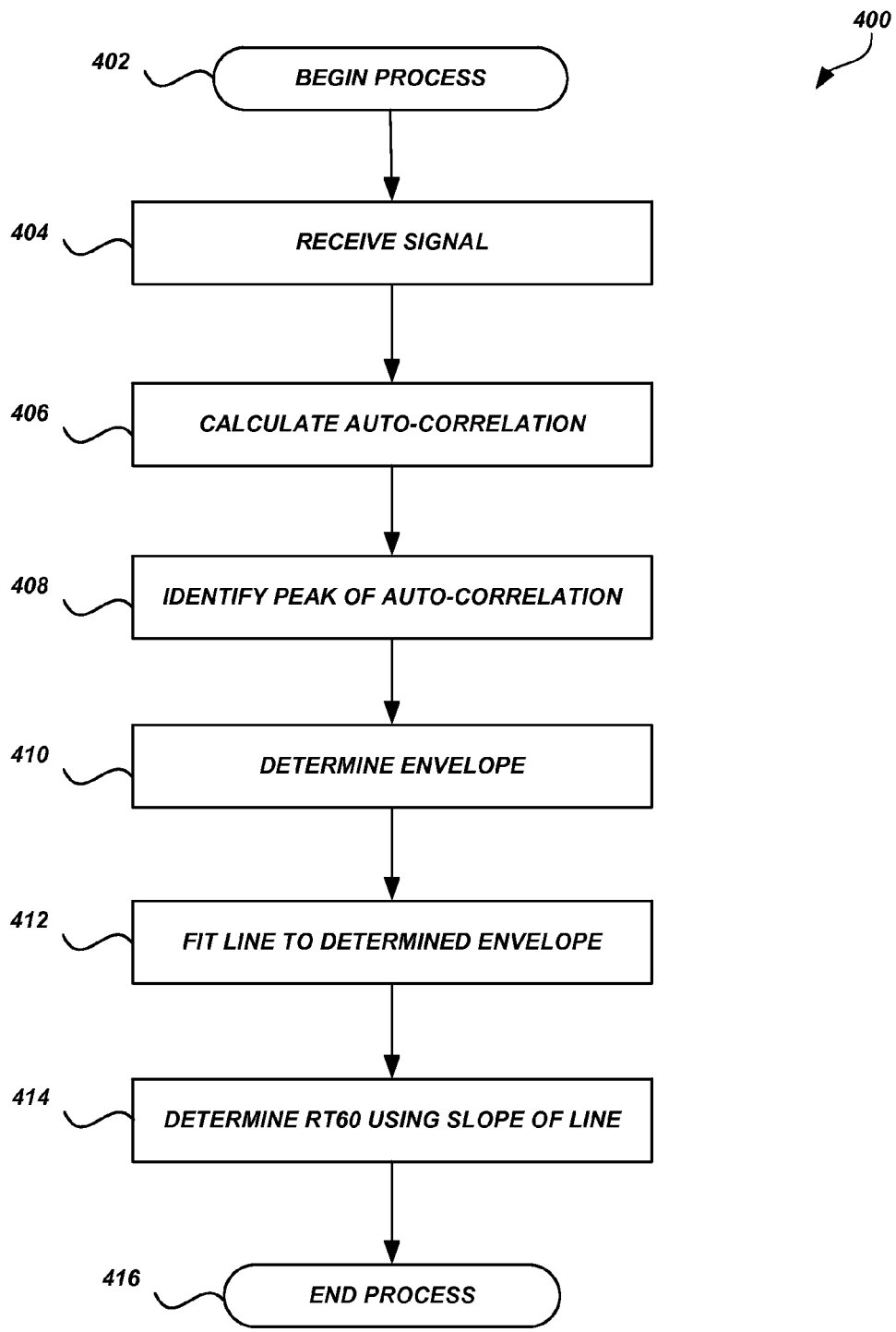
FIG. 4 is an illustrative diagram of acoustic signal intensity over time according to some embodiments.

At block 210, the blind reverberation estimation module 110 or some other module or component of the spoken language processing system 100 can blindly estimate the reverberation for the current environment at the current time. An example process for blind estimation of reverberation is shown in FIG. 4 and described in greater detail below. In the current example, the blind reverberation estimation module 110 generates an estimated RT60 value 330, shown in FIG. 3.

At block 212, the blind reverberation estimation module 110 or some other module or component of the spoken language processing system 100 can average the reverberation estimate generated at block 210 for the current signal (e.g., the current RT60 value) with the previous reverberation estimate (e.g., the previous RT60 value). In some embodiments, the current blind estimate may be averaged with an individual blind estimate generated at block 210 of a previous execution of the process 200 for a previous audio signal. In other embodiments, the current blind estimate may be averaged with the previous average estimate in a recursive manner. In further embodiments, the weight of prior estimates in the recursive average may be decayed such that more recent blind estimates contribute to the average to a greater degree than older blind estimates. In still further embodiments, the current blind estimate is not averaged with any prior blind estimates, but rather is used on its own.

At decision block 214, the blind reverberation estimation module 110 or some other module or component of the spoken language processing system 100 can determine whether the reverberation estimate (e.g., the RT60 value) exceeds a predetermined or dynamically determined threshold, which may be referred to as the reverberation time threshold. If so, the process 200 can proceed to block 216, where de-reverberation is applied to the current signal (e.g., the signal is processed by the de-reverberation module 114 to generate a de-reverberated signal). Otherwise, if the reverberation level does not exceed the reverberation time threshold, no de-reverberation is applied and the process 200 terminates at block 218. In some embodiments, the reverberation time threshold may vary, depending upon the consumer of the audio signal. For example, one particular ASR module 116 may produce satisfactory results when processing signals with a wide range of reverberation times, or signals with a large reverberation time. Another ASR module may produce satisfactory results only when processing signals with reverberation times within a small range, or only when processing signals with a low reverberation time. The reverberation time threshold can be tailored for the individual ASR modules, and may therefore be different when making the de-reverberation determinations on signals to be provided to the different ASR modules. In additional embodiments, the reverberation time threshold may vary, depending upon certain operational characteristics of the de-reverberation module 114. For example, if the de-reverberation module 114 introduces a large degree of latency and/or if the de-reverberation module 114 consumes a large amount of power, then de-reverberation may only be used for audio signals with a large reverberation time. If the de-reverberation module 114 introduces minimal latency and/or consumes a low amount of power, then de-reverberation may be used more often (e.g., even for audio signals with lower reverberation times).

In some embodiments, the determination of whether to apply de-reverberation to an audio signal may not be based on an analysis of the same audio signal, but rather may be based on a previously-determined blind estimate of reverberation. For example, in spoken language processing system 100 that provides real-time speech recognition, the audio signal may be processed by the ASR module as it is received rather than waiting for receipt of an audio signal of the complete utterance (e.g., the ASR module may begin processing before the user has finished speaking, or before the entire audio signal is provided to the spoken language processing system 100). In such cases, analyzing the audio signal to blindly estimate reverberation may not be possible or feasible while still allowing the ASR module provide real-time or substantially real-time results using the same audio signal. Thus, the determination of whether to apply de-reverberation to the audio signal may be based on a previously-determined blind estimate of reverberation. The spoken language processing system 100 may blindly estimate reverberation in a background process (e.g., after speech recognition has been performed on the signal, or in parallel), in a batch process (e.g., processing a batch of recorded audio signals during a period of system inactivity), on a delay of one or more signals or utterances (e.g., the de-reverberation determination may be based on the blind reverberation estimate generated using the previous signal), etc.

Example Process for Blind Estimation of Reverberation

FIG. 4 shows an illustrative process 400 for blindly estimating reverberation in an environment using autocorrelation of sound intensity and extrapolation to the RT60 value. The process 400 begins at block 402. The process 400 may be embodied in a set of executable program instructions stored on a computer-readable medium, such as one or more disk drives, of a computing system associated with the spoken language processing system 100, such as the computing system 600 shown in FIG. 6 and described in greater detail below. When the process 400 is initiated, the executable program instructions can be loaded into memory, such as RAM, and executed by one or more processors of the computing system. In some embodiments, the process 400 may be part of the process 200 described above (e.g., block 210), or it may be a separate process that is invoked by the process 200.

At block 404, the blind reverberation estimation module 110 or some other module or component of the spoken language processing system 100 can obtain an audio signal. The audio signal may be provided by a microphone 104, as shown in FIG. 1, or by some other acoustic sensor. Illustratively, the audio signal may include audio of an utterance made be a user 102 and captured by the microphone 104 in a particular environment, such as a room. In some embodiments, one or more audio signals may be provided to the blind reverberation estimation module 110 in a batch or background process as described in greater detail above, rather than in real-time as the audio signals are received by the spoken language processing system 100.

At block 406, the blind reverberation estimation module 110 or some other module or component of the spoken language processing system 100 can compute the autocorrelation for the current signal at various delays, and then generate an auto-correlogram using the results. In some embodiments, the autocorrelation can be computed by delaying the signal by each of a plurality of predetermined sample amounts. For example, the autocorrelation can be computed by delaying the signal by 1 sample, and multiplying the delayed signal by the original signal. This operation gives the autocorrelation for a 1 sample delay. The operation can be repeated for multiple delays (e.g., delaying the signal by 2 samples and multiplying by the original, then delaying the signal by 3 samples and multiplying by the original, and so on, up to some predetermined or dynamically determined number of samples). An auto-correlogram can be generated using the output of these operations by plotting the correlation values for each number of samples delayed.

In some embodiments, the current signal may be modeled using equation (1) below:

$$x(n)=s(n)+\Sigma_{k=1}^{\infty}a_k s(n-k)+v(n) \quad (1)$$

in which s(n) is the direct path signal (e.g., the non-reflected signal), $a_k s(n-k)$ is the signal component for each reflected path k, $a_k$ is the attenuation factor for path k, and v(n) is the additive noise (e.g., the background noise).

The autocorrelation of the input signal can be modeled using equation (2) below:

$$r_x^{AC}(p)=E[x(t)x(t+p)]=E[(s(n)+\Sigma_{k=1}^{\infty}a_k s(n-k)+v(n))(s(n+p)+\Sigma_{k=1}^{\infty}a_k s(n-k+p)+v(n+p))] \quad (2)$$

in which p is the sample delay. Although there will be nine terms on the right side of equation (2) after expansion, the four terms that involve the background noise can be disregarded by assuming that the background noise is uncorrelated with the signal source. Thus, equation (2) can be expanded and simplified as equation (3) below:

$$r_x^{AC}(p)=E[s(n)s(n+p)]+E[\Sigma_{k=1}^{\infty}a_k s(n+p)s(n-k)]+E[\Sigma_{k=1}^{\infty}a_k s(n-k)\Sigma_{k=1}^{\infty}a_k s(n-k+p)]+E[\Sigma_{k=1}^{\infty}a_k s(n)s(n-k+p)]+E[v(n)v(n+p)] \quad (3)$$

As p increases, the correlation between s(n) and s(n+p) may decrease sharply because the human voice is non-stationary. Thus, by disregarding the first 5 dB of reduction, as described in greater detail above, the effect of the first two terms of equation (3) becomes insignificant and can be disregarded. The third term can be disregarded because early reflections (e.g., those in the first 30-50 ms) are insignificant and late reflections have an attenuation factor small enough that the term's contribution is insignificant. The fifth term can be disregarded because, by using the dynamic threshold determination described in greater detail above, only signals with at least a threshold signal-to-noise ratio may be evaluated. In the fourth term, $a_p E[s(n)s(n)]$ for k=p can be assumed to dominate the autocorrelation values determined using equation (3), and thus may be used as the autocorrelation value in generating the auto-correlogram. Such an auto-correlogram can represent the attenuation trend of the reflected paths.

Figure 5:
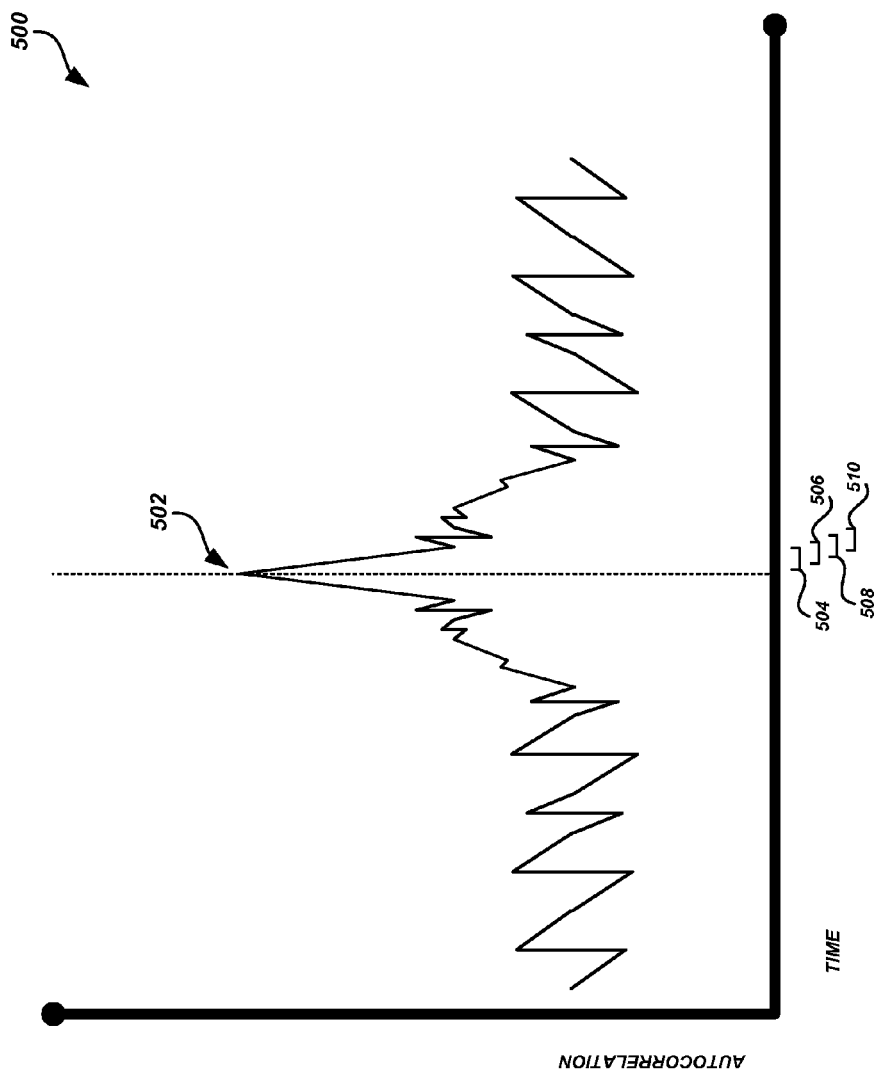
FIG. 5 is an illustrative auto-correlogram of an acoustic signal according to some embodiments.

FIG. 5 shows an illustrative auto-correlogram 500 generated by the blind reverberation estimation module 110 for a particular input signal. As shown, the y-axis may correspond to the calculated autocorrelation values, and the x-axis may correspond to indices of the number of samples delayed for each data point. In some embodiments, the auto-correlogram can be converted to a decibel scale and normalized so that values can be extrapolated to, e.g., the RT60 value, as described in greater detail below.

At block 408, the blind reverberation estimation module 110 or some other module or component of the spoken language processing system 100 can identify the peak of the auto-correlogram generated above at block 406. As shown in FIG. 5, the peak 502 can be identified as the maximum autocorrelation value (e.g., the maximum y value) in the auto-correlogram 500.

At block 410, the blind reverberation estimation module 110 or some other module or component of the spoken language processing system 100 can determine the envelope of the tail of the auto-correlogram after the peak. The envelope corresponds to upper bound of the auto-correlogram values for the tail after the peak 502. In some embodiments, the envelope can be determined by identifying a series of local maximum autocorrelation values in a sliding window. As shown in FIG. 5, the sliding window may encompass multiple consecutive values in a first time range 504, which begins at or shortly after the peak 502. The maximum value of the auto-correlogram within the time range 504 can be determined, and then the sliding window may slide to encompass the set of values in a next time range 506. Illustratively, time range 506 may encompass i values (where i is a positive integer), including the right-most i−j values of time range 504 (where j is a positive integer that is typically less than i, such as 1). The maximum value within time range 506 can be determined, and then the sliding window may slide to encompass the next set of i values in time range 508, time range 510, and so on. In this way, a plot of maximum values can be generated.

In some embodiments, the blind reverberation estimation module 110 may not determine the maximum value in the sliding window, but may instead determine an average or median value in the sliding window. In additional embodiments, the blind reverberation estimation module 110 may not use a sliding window to capture the envelope of the tail. Instead, the maximum value (or average value, or median value, etc.) for each time range may be determined with no overlap in the time ranges.

At block 412, the blind reverberation estimation module 110 or some other module or component of the spoken language processing system 100 can fit a line to the envelope or generate some other function approximating the envelope determined above in block 410. The line or other function may approximate the intensity of sound with respect to time, and the slope of the line or other function may approximate the rate of sound decay with respect to time.

In some embodiments, a line may be fit to the data points in the tail without any determination or extraction of the envelope. Instead, all data points of the tail, or some subset thereof, may be selected and a line may be fit to the selected data points. For example, a threshold number of data points may be selected, or data points exceeding some threshold value may be selected for use in line-fitting.

At block 414, the blind reverberation estimation module 110 or some other module or component of the spoken language processing system 100 can use the line, fit at block 412, to determine the RT60 value. Illustratively, the line has a slope that corresponds to the rate of sound decay for the current audio signal. Using the slope, observed values other reverberation time measurements, such as RT20 or RT30, can be extrapolated to generate an RT60 value.

Execution Environment

Figure 6:
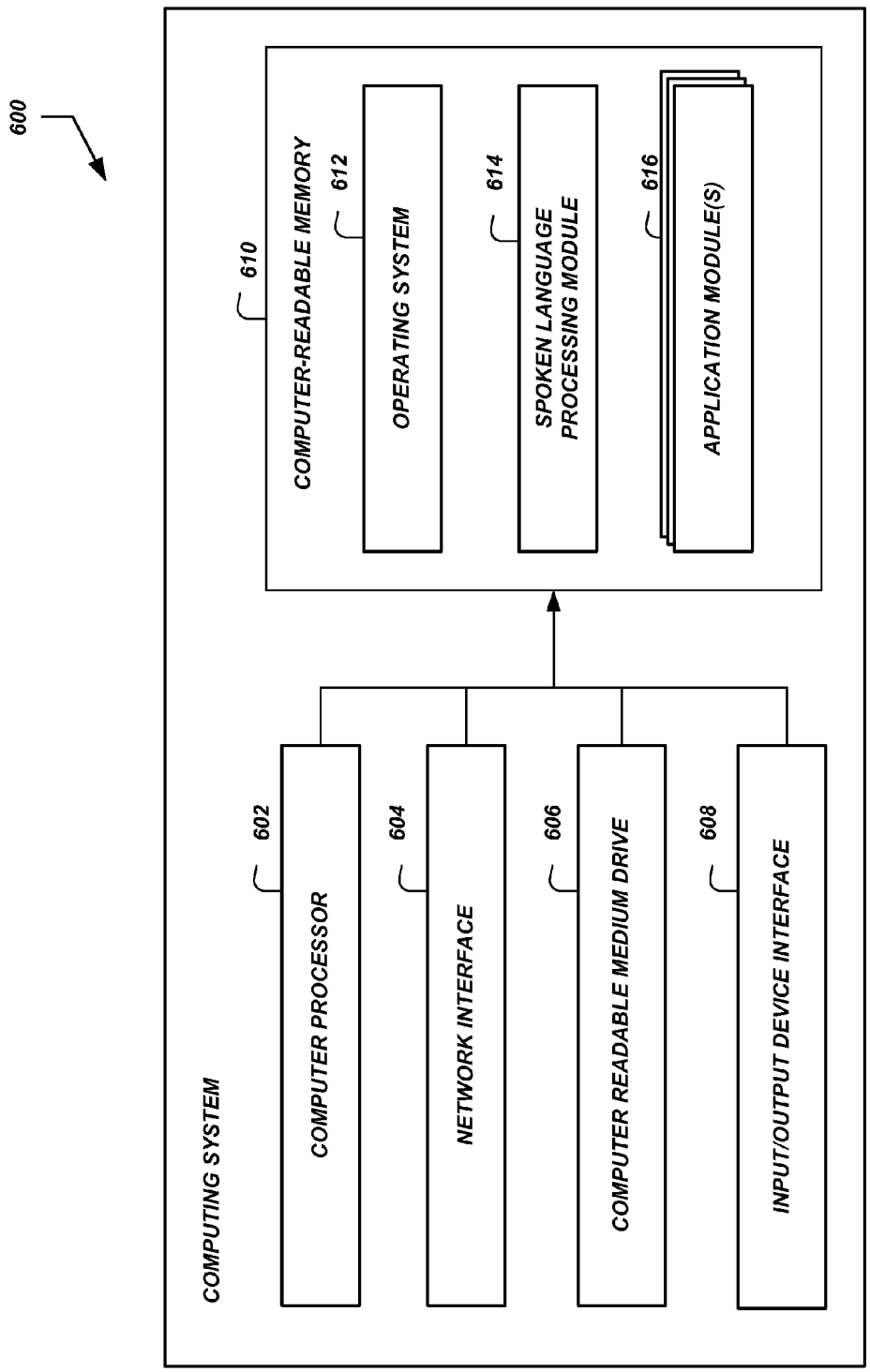
FIG. 6 is a block diagram of an illustrative computing system configured to implement blind estimation of reverberation according to some embodiments.

FIG. 6 illustrates an example computing system 600 configured to execute the processes and implement the features described above. In some embodiments, the computing system 600 may include: one or more computer processors 602, such as physical central processing units ("CPUs"); one or more network interfaces 604, such as a network interface cards ("NICs"); one or more computer readable medium drives 606, such as a high density disk ("HDDs"), solid state drives ("SDDs"), flash drives, and/or other persistent non-transitory computer-readable media; an input/output device interface 608, such as an IO interface in communication with one or more microphones; and one or more computer readable memories 610, such as random access memory ("RAM") and/or other volatile non-transitory computer readable media.

The network interface 604 can provide connectivity to one or more networks or computing systems. The computer processor 602 can receive information and instructions from other computing systems or services via the network interface 604. The network interface 604 can also store data directly to the computer-readable memory 610. The computer processor 602 can communicate to and from the computer-readable memory 610, execute instructions and process data in the computer readable memory 610, etc.

The computer readable memory 610 may include computer program instructions that the computer processor 602 executes in order to implement one or more embodiments. The computer readable memory 610 can store an operating system 612 that provides computer program instructions for use by the computer processor 602 in the general administration and operation of the computing system 600. The computer readable memory 610 can further include computer program instructions and other information for implementing aspects of the present disclosure. For example, in one embodiment, the computer readable memory 610 includes a spoken language processing module 614 that performs the operations described above with respect to processes 200 and 400, one or more application modules 616 that perform functions based on the output of the spoken language processing module 614, etc. In such cases, the computing system 600 may, alone or in combination with other computing systems, perform some or all of the functions of the spoken language processing system 100 described herein. For example, multiple computing systems 600 may communicate with each other via their respective network interfaces 604, and can implement blind estimation of reverberation and selective application of de-reverberation individually (e.g., each computing system 600 may execute one or more separate instances of the processes 200 and/or 400), in parallel (e.g., each computing system 600 may execute a portion of a single instance of a process 200 and/or 400), etc.

TERMINOLOGY

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multithreaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
   a computer-readable memory storing executable instructions; and
   one or more physical computer processors in communication with the computer-readable memory, wherein the one or more physical computer processors are programmed by the executable instructions to:
      receive a first audio signal comprising:
         first audio data corresponding to a user utterance; and
         second audio data corresponding to reverberation of the utterance;
      determine a dynamic range of sound intensity of the first audio signal as a difference in sound intensity between a first portion of the first audio signal corresponding to a time at which the user utterance has ended and a second portion of the first audio signal corresponding to background noise;
      determine that the dynamic range exceeds a dynamic range threshold;
      determine a maximum autocorrelation for the first audio signal by determining the maximum value of a first function modeling a correlation of the first audio data with the second audio data;
      select a local maximum autocorrelation value for each of a plurality of groups of values of the first function, wherein each of the plurality of groups of values of the first function comprises consecutive values associated with a decrease from the maximum autocorrelation;
      determine a second function approximating a decrease in sound intensity in the first audio signal after the time at which the user utterance has ended by approximating the local maximum autocorrelation values for the plurality of groups of values with respect to time;
      determine a current reverberation time by computing a value of the second function corresponding to a threshold decrease in sound intensity;
      determine an average reverberation time by averaging the current reverberation time and a previous reverberation time;
      determine that the average reverberation time exceeds a reverberation time threshold;
      obtain a second audio signal; and
      generate a de-reverberated audio signal by processing the second audio signal using the average reverberation time to reduce reverberation in the second audio signal.

2. The system of claim 1, wherein the executable instructions further program the one or more physical computer processors to generate an auto-correlogram of the first function, wherein the maximum autocorrelation is determined by identifying a peak of the auto-correlogram.

3. The system of claim 2, wherein the executable instructions that program the one or more physical computer processors to select the local maximum autocorrelation value for each of the plurality of groups of values comprise executable instructions to determine an envelope of a portion of the auto-correlogram, wherein each group of the plurality of groups of values corresponds to a different group of consecutive values within a sliding window.

4. The system of claim 1, wherein the executable instructions further program the one or more physical computer processors to:
   determine that a first acoustic model of a plurality of acoustic models is trained for use with audio signals associated with the average reverberation time; and
   perform automatic speech recognition on the de-reverberated audio signal using the model.

5. A computer-implemented method comprising:
   under control of one or more computing devices configured with specific computer-executable instructions,
      obtaining a first audio signal comprising:
         first audio data corresponding to an utterance of a user; and
         second audio data corresponding to reverberation of the utterance;

generating a plurality of autocorrelation values regarding a correlation of sound intensity of the first audio data with respect to the second audio data;

determining a rate of sound decay of reverberation in the first audio signal using at least a portion of the plurality of autocorrelation values, wherein the portion of the plurality of autocorrelation values is associated with a decrease from a peak autocorrelation value of the plurality of autocorrelation values;

determining a reverberation time using the rate of sound decay;

obtaining a second audio signal; and generating a de-reverberated audio signal, using the second audio signal, based at least partly on the reverberation time.

6. The computer-implemented method of claim 5, further comprising:

generating an auto-correlogram using the plurality of autocorrelation values; and determining the peak autocorrelation value using the auto-correlogram.

7. The computer-implemented method of claim 6, wherein determining the rate of sound decay comprises:

determining a plurality of autocorrelation value groups, wherein individual autocorrelation value groups of the plurality of autocorrelation value groups comprise a subset of the autocorrelation values associated with the decrease from the peak autocorrelation value in the auto-correlogram; and selecting a local maximum for individual autocorrelation value groups.

8. The computer-implemented method of claim 6, further comprising identifying an envelope of a portion of the auto-correlogram, wherein determining the rate of sound decay in the first audio signal comprises using the envelope.

9. The computer-implemented method of claim 5, further comprising:

determining a dynamic range of sound intensity of the first audio signal; and determining that the dynamic range exceeds a dynamic range threshold, wherein the dynamic range threshold is based on at least one of: an operating characteristics of a de-reverberation module, or an operating characteristic of an automatic speech recognition model.

10. The computer-implemented method of claim 5, further comprising determining an average reverberation time using the reverberation time and a prior reverberation time determined using a different audio signal.

11. The computer-implemented method of claim 10, wherein the prior reverberation time comprises a prior average reverberation time generated using a plurality of reverberation times, wherein the plurality of reverberation times are weighted such that more recent reverberation times contribute more than older reverberations times.

12. The computer-implemented method of claim 5, further comprising performing automatic speech recognition on the de-reverberated audio signal by selecting an acoustic model based at least partly on the reverberation time.

13. One or more non-transitory computer readable media comprising executable code that, when executed, cause one or more computing devices to perform a process comprising:

obtaining a first audio signal comprising:

first audio data corresponding to an utterance of a user; and second audio data corresponding to reverberation of the utterance;

generating a plurality of autocorrelation values regarding a correlation of sound intensity of the first audio data with respect to the second audio data;

determining a rate of sound decay in the first audio signal using at least a portion of the plurality of autocorrelation values, wherein the portion of the plurality of autocorrelation values is associated with a decrease from a peak autocorrelation value of the plurality of autocorrelation values;

determining a reverberation time using the rate of sound decay;

obtaining a second audio signal; and generating a de-reverberated audio signal, using the second audio signal, based at least partly on the reverberation time.

14. The one or more non-transitory computer readable media of claim 13, wherein the process further comprises:

generating an auto-correlogram using the plurality of autocorrelation values; and determining the peak autocorrelation value using the auto-correlogram.

15. The one or more non-transitory computer readable media of claim 14 wherein determining the rate of sound decay comprises:

determining a plurality of autocorrelation value groups, wherein individual autocorrelation value groups of the plurality of autocorrelation value groups comprise a subset of the autocorrelation values associated with the decrease from the peak autocorrelation value in the auto-correlogram; and selecting a local maximum for individual autocorrelation value groups.

16. The one or more non-transitory computer readable media of claim 14, wherein the process further comprises identifying an envelope of a portion of the auto-correlogram, and wherein determining the rate of sound decay in the first audio signal comprises using the envelope.

17. The one or more non-transitory computer readable media of claim 13, wherein the process further comprises:

determining a dynamic range of sound intensity of the first audio signal; and determining that the dynamic range exceeds a dynamic range threshold, wherein the dynamic range threshold is based on at least one of: an operating characteristics of a de-reverberation module, or an operating characteristic of an automatic speech recognition model.

18. The one or more non-transitory computer readable media of claim 13, wherein the process further comprises determining an average reverberation time using the reverberation time and a prior reverberation time determined using a different audio signal.

19. The one or more non-transitory computer readable media of claim 18, wherein the prior reverberation time comprises a prior average reverberation time generated using a plurality of reverberation times, wherein the plurality of reverberation times are weighted such that more recent reverberation times contribute more than older reverberations times.

20. The one or more non-transitory computer readable media of claim 13, wherein the process further comprises performing automatic speech recognition on a subsequently-received auto signal by selecting an acoustic model based at least partly on the reverberation time.

* * * * *